United States Patent
Shilane et al.

(10) Patent No.: US 12,141,619 B2
(45) Date of Patent: *Nov. 12, 2024

(54) SCALE OUT DEDUPLICATED FILE SYSTEM AS MICROSERVICES

(71) Applicant: EMC IP Holding Company LLC, Hopkinton, MA (US)

(72) Inventors: Philip Shilane, Newtown, PA (US); Abhinav Duggal, Milpitas, CA (US); George Mathew, Belmont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/522,765

(22) Filed: Nov. 29, 2023

(65) Prior Publication Data

US 2024/0095084 A1 Mar. 21, 2024

Related U.S. Application Data

(63) Continuation of application No. 17/215,586, filed on Mar. 29, 2021, now Pat. No. 11,893,422.

(51) Int. Cl.
| | | |
|---|---|---|
| *G06F 9/50* | (2006.01) | |
| *G06F 16/13* | (2019.01) | |
| *G06F 16/16* | (2019.01) | |
| *G06F 16/174* | (2019.01) | |
| *H04L 67/1023* | (2022.01) | |

(52) U.S. Cl.
CPC ............ *G06F 9/505* (2013.01); *G06F 16/134* (2019.01); *G06F 16/162* (2019.01); *G06F 16/1748* (2019.01); *H04L 67/1023* (2013.01)

(58) Field of Classification Search
None
See application file for complete search history.

(56) References Cited

U.S. PATENT DOCUMENTS

| | | | | |
|---|---|---|---|---|
| 7,386,616 B1 * | 6/2008 | Henzinger | .......... | H04L 67/1019 709/226 |
| 8,250,325 B2 * | 8/2012 | Holdman | ............ | G06F 16/1752 711/E12.009 |
| 8,321,648 B2 * | 11/2012 | Condict | .................. | G06F 3/067 711/170 |
| 8,626,723 B2 * | 1/2014 | Ben-Shaul | .............. | G06F 3/067 707/692 |
| 8,825,720 B1 * | 9/2014 | Xie | ..................... | G06F 16/1748 707/694 |

(Continued)

*Primary Examiner* — Van H Nguyen
(74) *Attorney, Agent, or Firm* — Staniford Tomita LLP

(57) ABSTRACT

Mapping information identifies ranges of files, a set of front-end microservices, and assignments of the ranges to the front-end microservices. Each front-end microservice is thereby responsible for a range of files. The files are represented by segment trees and the front-end microservices handle operations involving an upper-level of the segment trees. A file system request on a file is directed to a particular front-end microservice that is responsible for handling a particular range of files within which the file falls according to the mapping information. An indication is received from a container orchestration service that a number of front-end microservices has changed. The mapping information is updated based on the change in the number of front-end microservices.

15 Claims, 9 Drawing Sheets

(56) References Cited

U.S. PATENT DOCUMENTS

| | | | | |
|---|---|---|---|---|
| 8,862,559 | B2* | 10/2014 | Jayaraman | G06F 16/2365 |
| | | | | 711/170 |
| 8,898,114 | B1* | 11/2014 | Feathergill | G06F 11/1453 |
| | | | | 707/648 |
| 9,225,691 | B1* | 12/2015 | Balasubramanian | |
| | | | | H04L 9/3239 |
| 9,679,153 | B2* | 6/2017 | Grube | G06F 21/6218 |
| 9,946,724 | B1* | 4/2018 | Ghosh | G06F 16/1748 |
| 10,534,674 | B1* | 1/2020 | Karmarkar | G06F 11/1471 |
| 10,795,859 | B1* | 10/2020 | Wallace | G06F 9/5083 |
| 10,795,860 | B1* | 10/2020 | Wallace | H04L 67/1097 |
| 10,860,212 | B1* | 12/2020 | Chinthekindi | G06F 16/185 |
| 10,936,435 | B2* | 3/2021 | Natanzon | G06F 8/65 |
| 10,936,444 | B2* | 3/2021 | Rhodes | G06F 11/1464 |
| 10,956,388 | B2* | 3/2021 | Shilane | G06F 16/2255 |
| 11,226,865 | B2* | 1/2022 | Wong | G06F 16/1748 |
| 11,343,282 | B2* | 5/2022 | Bett | G06F 11/1451 |
| 11,349,915 | B2* | 5/2022 | Xu | H04L 67/06 |
| 11,520,744 | B1* | 12/2022 | Rajimwale | G06F 16/901 |
| 11,893,422 | B2* | 2/2024 | Shilane | G06F 9/547 |

* cited by examiner

SCALE OUT DEDUPLICATED FILE SYSTEM AS MICROSERVICES

CROSS-REFERENCE TO RELATED APPLICATIONS

This application is a continuation of U.S. patent application Ser. No. 17/215,586, filed Mar. 29, 2021 (now U.S. Pat. No. 11,893,422), and is incorporated by reference for all purposes along with all other references cited in this application.

TECHNICAL FIELD

The present invention relates generally to information processing systems, and more particularly to file systems.

BACKGROUND

It is desirable to scale resource availability in response to demand. During periods of low demand, reducing resource availability can help an organization save costs. During periods of high demand, increasing resource availability can help an organization rapidly respond to the needs of its customers. Demand for services can fluctuate greatly over time.

An example of a resource in which scalability is desirable is a file system. File systems organize data stored in a storage system into a logical format for access by clients and applications. A file system allows clients and applications to make requests for file operations such as write, read, overwrite, folder operations, copy, and so forth. A deduplicated file system is a type of file system that can reduce the amount of redundant data that is stored. In particular, if a particular piece of data is identified as a duplicate, the data is not again stored. Instead, a reference can be created pointing to the previously stored data. Having a deduplicated file system is especially desirable when supporting large data sets involving hundreds of millions of files occupying many thousands of terabytes.

Conventional file systems, including deduplicated file systems, are typically designed using monolithic architectures that are difficult to scale, or employ architectures lacking resiliency. As a result, there can be an under-utilization of resources during periods of low demand and an over-utilization of resources during periods of high demand. There is a need for improved systems and techniques that allow a file system to scale up or down while also ensuring resiliency.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
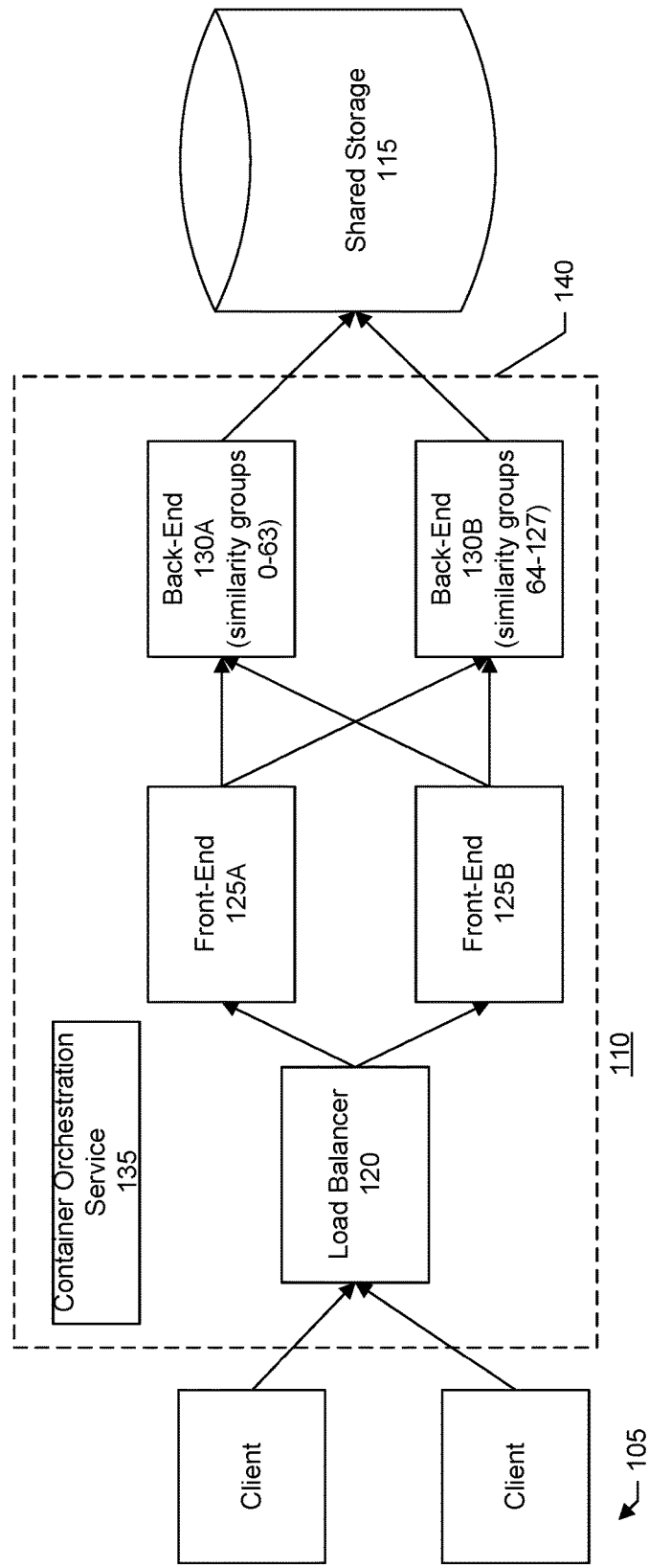
FIG. 1 shows a block diagram of an information processing system comprising a scale out deduplicated file system, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks shown in the figures may be functional and there can be many different hardware and software configurations to implement the functions described.

Disclosed herein are methods and systems for a file system implemented as a set of microservices for scalability. In an embodiment, the file system is a deduplicated distributed file system. The file system provides a way to organize data stored in a storage system and present that data to clients and applications in a logical format. The file system organizes the data into files and folders into which the files may be stored. When a client requests access to a file, the file system issues a file handle or other identifier for the file to the client. The client can use the file handle or other identifier in subsequent operations involving the file. A namespace of the file system provides a hierarchical organizational structure for identifying file system objects through a file path. A file can be identified by its path through a structure of folders and subfolders in the file system. A file system may hold many hundreds of thousands or even many millions of files across many different folders and subfolders and spanning thousands of terabytes.

In an embodiment, the file system supports network protocols for accessing remote centrally stored data. An example of such a protocol includes Network File System (NFS). NFS is a distributed file system protocol originally developed by Sun Microsystems in 1984. NFS allows a user on a client computer to access files over a computer network much like local storage is accessed. NFS allows the client computer to mount a remote file system as if it were a local file system. Thus, users—regardless of what workstation they may be using—can have access to their files in a centrally managed manner Such file systems facilitate document and workspace sharing and data consistency as users on the network will be accessing the same set of files. Other examples of supported file system protocols allowing for remote access include Common Internet File System (CIFS), Server Message Block (SMB), and others.

Storage systems have moved towards scalable designs that can grow with customer demand by adding storage and computation as necessary. File systems, however, are typically monolith architectures with most of the modules running in a single process space along with attached storage. There is a need for a file system that is scalable—up or down as demand fluctuates and changes—while also supporting file system properties such as complex namespace and random input/output (IO) requirements. File system protocols are very different from object storage protocols as file system protocols require handling complexities such as namespace updates including file and folder creation and deletion as well as random IO reads and write to files. In an embodiment, systems and techniques are provided for a deduplicated file system implemented as a set of microservices running as containers and using an underlying shared storage system for persistence. The design allows for handling both a complex namespace and random IO in a scale out architecture that can continue to provide file access even if services fail.

In this embodiment, a load balancer directs file accesses consistently to a front-end service that manages the namespace operations and builds a tree structure for files to support random IO. The data for a file is divided into large units referred to as L1s (level one in a multi-level tree) spanning megabytes of content, which are directed consistently to a back-end service where deduplication takes place as well as compression and storage of the data to the underlying shared storage system. Based on growing demands, the shared storage can increase as well as the number of instances for each service. For example, instances of any of the load balancer, front-end, or back-end services may be added to accommodate growing demand. Alternatively, instances of any of the load balancer, front-end, or back-end services may be removed to accommodate a decrease in demand and reduce costs associated with the resources needed to run services. Embodiments provide containerized microservices that can be scaled, load balancing of file accesses consistently, management of interaction between front-end and back-end nodes using similarity groups for consistent assignment, and deduplication by the back-ends using a stream-informed segment layout (SISL) like algorithm. The algorithm facilitates inline deduplication (i.e., identifying duplicate segments in memory before storing to disk) and storing related segments and fingerprints together.

FIG. 1 shows a simplified block diagram of an information processing system having an architecture for a scale out deduplicated file system 110 as a set of microservices. The example shown in FIG. 1 includes a set of clients 105, file system 110, and shared storage 115. The file system includes a set of microservices including a load balancer 120, a set of front-ends 125A-B, and a set of back-ends 130A-B. The microservices are managed by a container orchestration service 135 such as Kubernetes. Kubernetes is an open-source container-orchestration system for automating computer application deployment, scaling, and management. In an embodiment with Kubernetes as the container orchestration service, the load balancer may be referred to as an ingress controller. There may be one or more instances of a custom ingress controller inside of the Kubernetes environment in order to handle consistent assignment and routing of file system requests as described herein. There can be a separate load balancer outside of the Kubernetes environment (or other containerized environment) that provides multiple IP addresses to a client.

A broken line 140 illustrates the container deployment or virtualized computing environment provided through the container orchestration service. A container is a virtualized computing environment to run an application program as a service or microservice. Containers are similar to virtual machines (VMs). Unlike VMs, however, containers have relaxed isolation properties to share the operating system (OS) among the containerized application programs. Containers are thus considered lightweight. Containers can be portable across hardware platforms including clouds because they are decoupled from the underlying infrastructure. Applications are run by containers as microservices with the container orchestration service facilitating scaling and failover. For example, the container orchestration service can restart containers that fail, replace containers, kill containers that fail to respond to health checks, and will withhold advertising them to clients until they are ready to serve.

As shown in the example of FIG. 1, the file system microservices run inside the virtualized environment provided by the orchestration service as containers. The container orchestration layer can run on one or multiple physical or virtual nodes, so it can run on premises with dedicated hardware or in a public cloud environment. The microservices shown within the orchestration environment include the load balancer, front-end, and back-end that process file system requests from the clients. After processing, data is stored in the shared storage system. The shared storage system may be a private or public object storage system or other highly available shared storage system that can scale to the needed size and provide data access even if there are underlying hardware failures.

More particularly, the load balancer provides a redirection layer from clients that are interacting with the storage system. While any front-end service can handle namespace operations and file accesses, each front-end is responsible for a subset of files and attempts to keep necessary state in-memory for efficiency. This state is globally available and can be handled by other instances in the case of an instance failure, though performance will be degraded until a failed service is restarted.

The load balancer is designed to redirect accesses based on file handles or other identifiers. In an embodiment, the file handle is hashed and a consistent hashing is used to determine which front-end instance is responsible for the file handle. The load balancer is a thin service that has little state besides identifying the set of running front-end services and the hash ranges that each front-end covers. This state can be determined by using a service discovery process to identify and query the front-end instances. As front-end instances fail or scale up or down, the load balancer is updated accordingly, and the full hash range will always be covered by the existing front-end instances.

The load balancer itself may be a single instance that is restarted as necessary by the container orchestration layer, or it may have multiple instances with domain name service (DNS) routing handled by a module between the clients and load balancer.

Below is a summary of the load balancer's operations:
1) Receive an access request with a file handle using a file system protocol (e.g., NFS or CIFS)
2) Hash the file handle
3) Determine which front-end is responsible for the hash value
4) Assign the access request to the responsible front-end The front-end microservice handles namespace operations, builds the file tree, and assigns data to back-end nodes for deduplication and storage. For namespace operations, the front-end accesses a Btree structure holding the namespace. A Btree is a self-balancing tree data structure that maintains sorted data and allows searches, sequential access, insertions, and deletions in logarithmic time. This Btree structure has the complete folder and file structure of the storage system as well as file modes. The structures may be partially cached on an instance of the front-end for performance, but the structures are globally accessible in shared storage in case an instance fails and another instance takes over the file handle hash range.

For folder and file updates, the Btree structure for the namespace is updated. Updating the Btree structure for the namespace includes acquiring a lock on relevant pages of the Btree, making the updates, and updating shared storage. The upper parts of the Btree may be cached in memory for efficiency. Global locks may be used to avoid concurrent updates to structures.

For a file write, the front-end creates a hierarchical tree structure representing the file, which may be referred to as the Lp tree (Level tree). The L1 nodes of the tree refer to L0 segments by a fingerprint (hash and other metadata). The front-end processes incoming data from a client to generate segments (e.g., variable 8 KB in size) that are the L0s of the tree, and then the upper levels of the tree reference lower levels.

Figure 2:
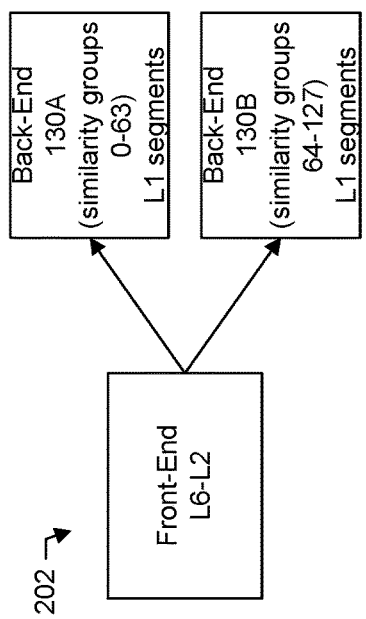
FIG. 2 shows an example of a front-end routing to specific back-ends based on similarity group assignments, according to one or more embodiments.

For reads and random IO, the front-end loads the Lp tree for a file from shared storage. A random read or write is handled by finding the position in the tree that refers to the requested data, and any updates to the Lp tree are handled by the front-end. Overwrites to a L1 are transferred to the back-end responsible for that L1 based on its similarity group. As shown in FIG. 2, front-end nodes 202 are responsible for the upper part of the Lp tree (e.g., L6-L2 segments) while back-end nodes are responsible for L1 segments.

An advantage of the load balancing technique is that a front-end consistently handles a file so a read after a write will go to the same front-end where the file metadata is likely still cached.

The front-end forms a L1 and transfers the L1 content (hundreds to thousands of segments) to a back-end for deduplication and storage. A multi-megabyte L1 is formed in a content defined manner. This begins by forming L0 segments in a content-defined manner and then selecting a boundary between L0 segments using a consistent algorithm. The front-end then represents the L1 span of data with a similarity group that is a numeric value in a specified range (e.g., 0-127).

The front-end then uses the similarity group to determine which back-end instance is responsible for the L1. In the example shown in FIG. 2, back-end 130A is responsible for similarity groups in the range of 0-63, and other back-end 130B is responsible for similarity groups in the range of 64-127. The similarity group is consistently hashed to a back-end, and the mapping of similarity group assignments is maintained. If a back-end fails or there are scale-up or scale-down events, the front-end instances are alerted about changes in the consistent hashing table.

An L1 segment may contain hundreds to thousands of L0 segments. The back-end is primarily responsible for deduplication, compression, and storage of the L0 segments. Each similarity group is its own deduplication domain, and since a similarity group is managed by a single back-end, the issue of different back-ends simultaneously updating structures related to similarity groups is avoided.

The back-end checks the L0 fingerprints against its memory cache. Only fingerprints associated with the same similarity group are filtered against. This means that the back-end has separate fingerprint caches for each similarity group, though many of the caches may be empty at any given time due to memory constraints.

If fingerprints match in the similarity group-based cache, the corresponding L0 segments are filtered out and do not need to be stored again. Otherwise, a fingerprint index for the similarity group is queried. Lookups to the fingerprint index are rate limited such as only allowing one lookup per 1 megabyte (MB) of content. The fingerprint index maps from a <fingerprint, similarity group> to a data structure holding the location where the segments are stored in a compression region as well the location where a list of fingerprints is stored that were previously stored consecutively. In an embodiment, there is a data storage structure referred to as a CMETA container. The CMETA container includes a header and metadata sections of multiple data containers. The CMETA structure is loaded from shared storage to the fingerprint cache for the current similarity group and a check of L0 fingerprints against the cache is performed.

For all L0 segments that are not duplicates, the unique segments are compressed into one or more compression regions. In an embodiment, the compression region size ranges from 64 K-128 KB but may vary in other embodiments. Compression regions are packed into a larger structure (container or object) that is written to shared storage, and the fingerprints for L0 segments of the same similarity group in that container are stored as a CMETA structure. The fingerprint index for the similarity group is updated to record the location and size of the L0 segment's compression region as well as the location of the CMETA structure.

Once the compression regions are durably stored (not necessarily to the long term storage), the back-end communicates with the front-end that the data is durable, and the front-end can acknowledge updates from the clients.

Since a similarity group is consistently assigned to a back-end instance, a read after write will route L1 accesses to the same back-end that processed the data, and the L0 segments may still be in the local cache. If not in the local cache, the back-end has the unique responsibility to access the L0 segments from shared storage.

An advantage of the file system is that file system services can scale based on demand or based on preconfigured scaling properties, and there is not necessarily a fixed number of back-end instances per front-end instance. In a scale-down event, the range (file handle ranges for front-ends and similarity group ranges for back-ends) handled by an instance is covered by another instance. A management service detects the scale-down event and reassigns the range either fully to a single instance or splits the range into pieces that are assigned to multiple instances of the appropriate type. If a front-end scales down, other front-end instances take over or assume responsibility for the file handle hash range, and the load balancer is updated with the new assignments.

If a back-end scales down, its similarity group range is assigned to one or more other back-end instances, and the front-end instances are updated about the similarity group assignments.

Scale-up events are handled in a similar way. When a new instance of a type is added due to demand, ranges handled by other instances are split and reassigned to the new instance. The assignment management service includes logic and an algorithm for splitting and merging ranges.

Instance failures may be temporary or long term. If an instance (e.g., load balancer, front-end, or back-end) temporarily fails, the container orchestration service attempts to restart it. The container orchestration service may attempt to restart the instance a pre-configured threshold number of times (e.g., 3 times). If it restarts properly, it will retain its area of coverage (file handles in the case of a front-end or similarity groups in the case of a back-end). A load balancer will reload its table mapping file handle hash ranges to front-end instances. For a front-end, that means the restarted instance will have the same range of file handle hashes as before the restart. Similarly, if a back-end restarts, it will retain its range of similarity groups.

There are cases where an instance cannot be restarted, possibly related to an underlying hardware failure for on-premises deployments. In that case, the file system cluster will continue to serve data, though in a degraded mode due to fewer hardware resources so that latency may be higher or throughput may be lower than in the fully-populated cluster. A long-term failure is handled in the same way as a scale-down event where ranges of values are reassigned to other instances. The current set of services takes over the ranges for services that are no longer available. That is, one or more front-end instances will take over file handle ranges previously served by an instance that has been removed, and one or more back-end instances will cover similarity group ranges previously assigned to a removed back-end. Each instance of the load balancer is updated with new mapping tables indicating new file handle hash ranges assigned to the remaining front-ends.

Figure 3A:
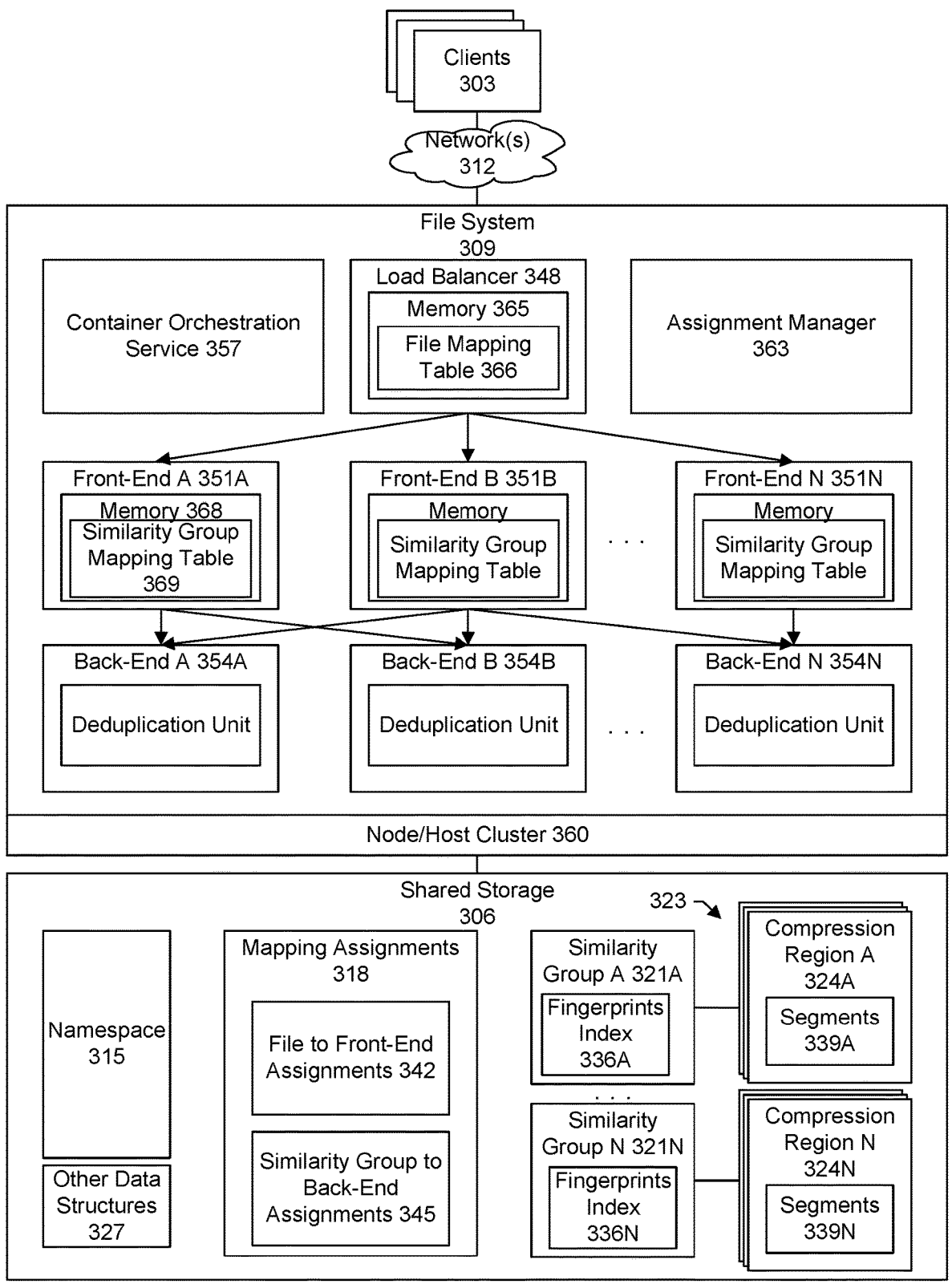
FIG. 3A shows further detail of a scale out deduplicated file system, according to one or more embodiments.

FIG. 3A shows another block diagram of an information processing system in which a scale out deduplicated file system may be implemented. This system includes any number of clients 303, a shared storage system 306, and a deduplicated file system 309 between the shared storage and clients. A network 312 connects the clients to the file system and shared storage. The clients can use file system protocols (e.g., NFS or CIFS) issued to the file system to request access to files stored in the shared storage system. The clients may have installed backup agents to perform backups of client files to the storage system.

The clients may include servers, desktop computers, laptops, tablets, smartphones, internet of things (IoT) devices, or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The shared storage may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, or an object or cloud storage service. In an embodiment, the storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, the shared storage may represent logical storage that includes any number of physical storage devices connected to form a logical storage.

In an embodiment, the shared storage includes several data structures to facilitate access to client data via file system protocols, scaling of the file system, and deduplication. In particular, the shared storage includes a namespace 315, mapping assignments 318, similarity groups 321A-N, compression regions 324A-N, and other structures 327. Mapping assignments may be stored in a key-value store or other competent data structure.

Figure 4:
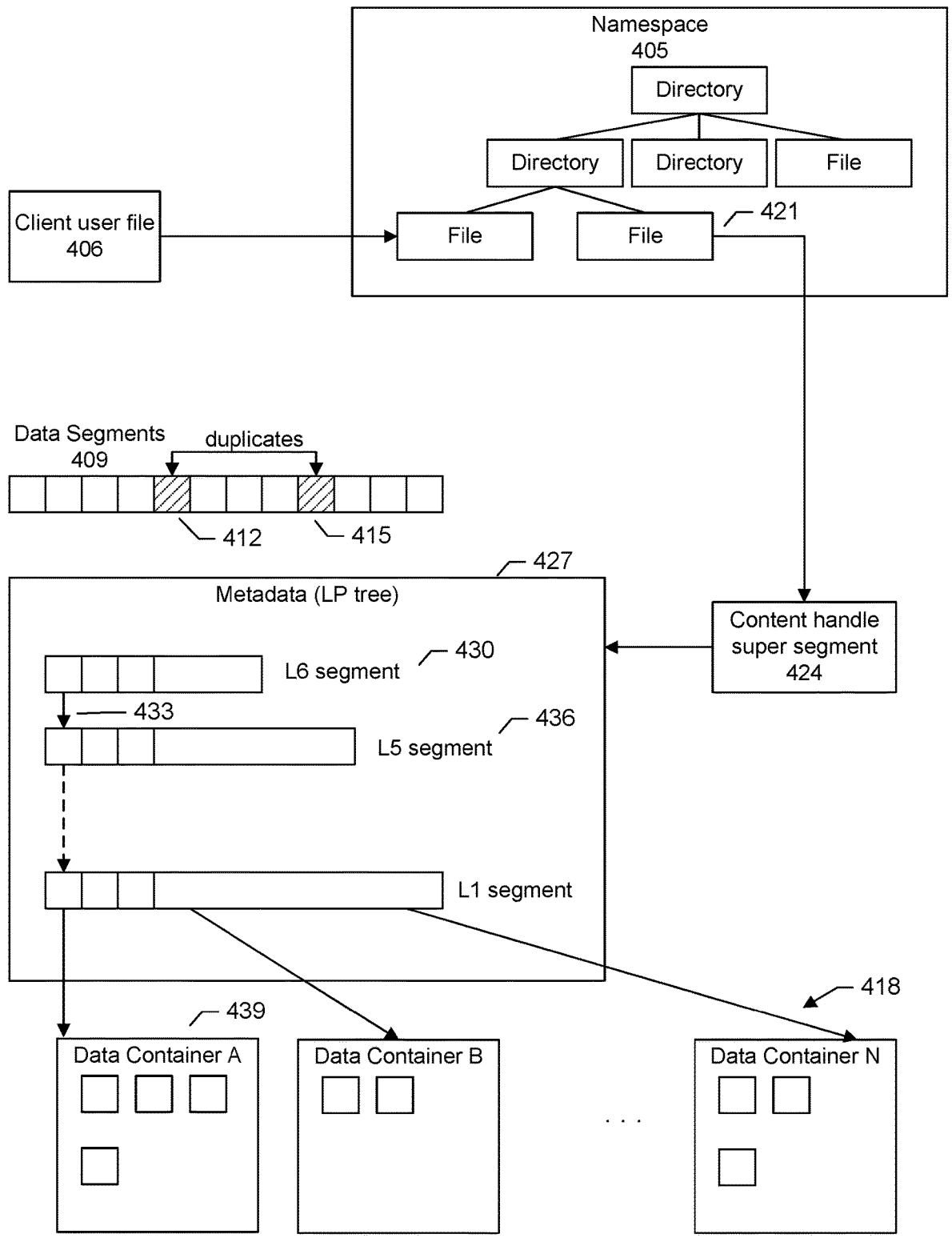
FIG. 4 shows an example of a deduplication process, according to one or more embodiments.

FIG. 4 shows a block diagram illustrating a deduplication process of the file system according to one or more embodiments. As shown in the example of FIG. 4, the file system includes a namespace 405. Further details of a file system namespace are provided in FIG. 5 and the discussion accompanying FIG. 5. As data, such as a user file 406, enters the file system, it is segmented into data segments 409 and filtered against existing segments to remove duplicates (e.g., duplicate segments 412, 415). A segment that happens to be the same as another segment that is already stored in the file system may not be again stored. This helps to eliminate redundant data and conserve storage space. Metadata, however, is stored that allows the file system to reconstruct or reassemble the file using the already or previously stored segment.

Any unique data segments are then stored in fixed size immutable containers 418. A content handle 421 of the file is kept in the file system's namespace to support the directory hierarchy. The content handle points to a super segment 424 which holds a reference to a top of a segment tree 427 of the file. The super segment points to a top reference 430 that points 433 to metadata 436 and data segments 439.

In other words, in a specific embodiment, each file in the file system may be represented by a segment tree. The segment tree includes a set of segment levels arranged into a hierarchy (e.g., parent-child). Each upper level of the segment tree includes one or more pointers or references to a lower level of the segment tree. A last upper level of the segment tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

A segment tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes.

In other words, in an embodiment, every segment in the file system is identified by a 24 byte key (or the fingerprint of the segment), including the LP segments. Each LP segment contains references to lower level LP segments.

Figure 5:
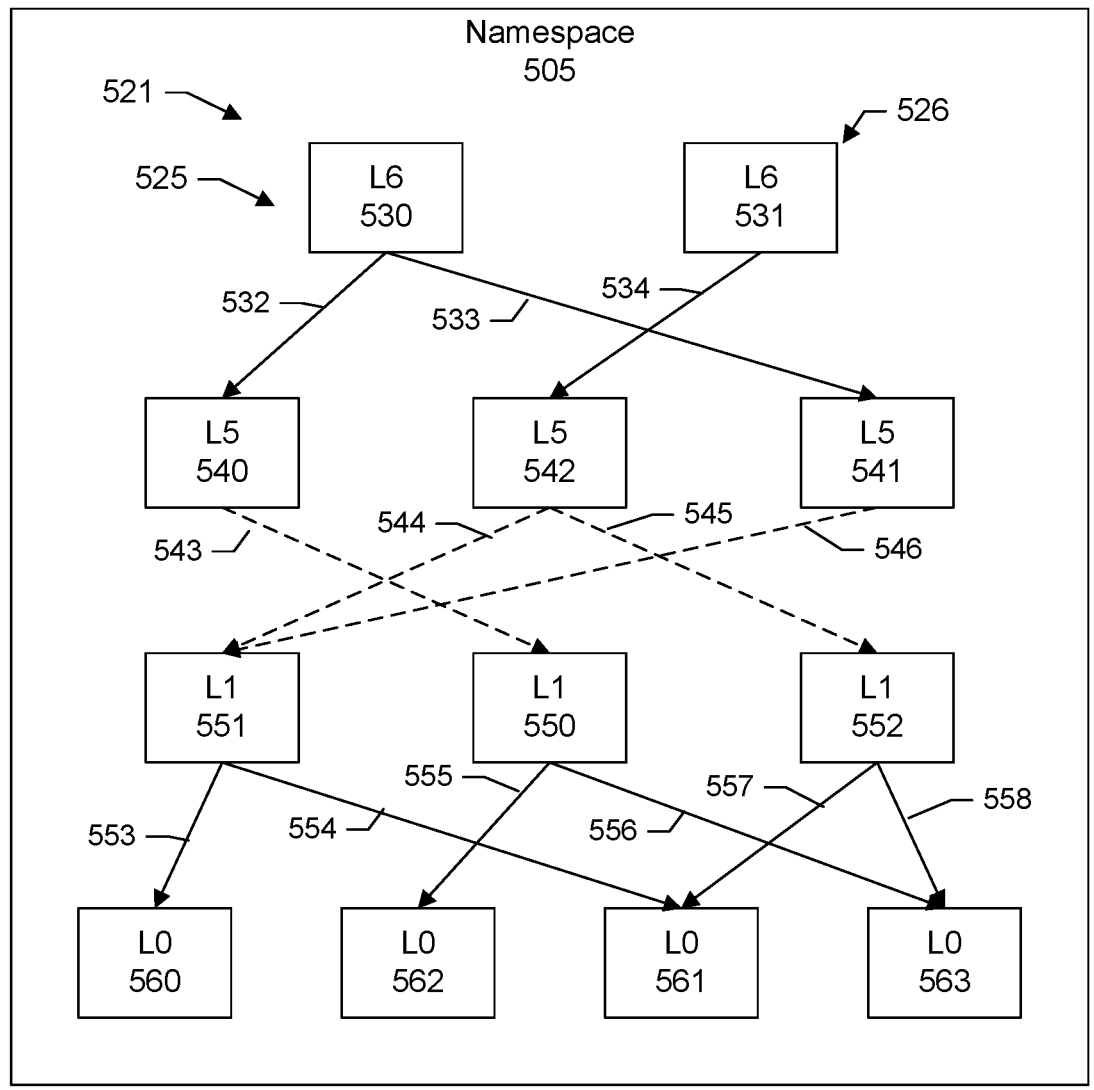
FIG. 5 shows an example of a namespace, according to one or more embodiments.

FIG. 5 shows further detail of a namespace 505 of the file system that may be used to organize the client data stored in the shared storage. Namespaces supporting file system protocols are much more complex than those for object storage service protocols. In particular, the namespace includes a set of segment trees 521 where each file in the file system is represented by a segment tree. A segment tree includes a set of segment levels arranged in a hierarchy. In a specific embodiment, a segment tree can have up to seven levels that may be labeled L6 to L0. For example, one or more intermediate levels may not be present for a relatively small file. A relatively small file may have, in addition to an L0 segment, just an L6 and L1 segment. A relatively large file may have, in addition to an L0 segment, an L6, L5, L4, L3, L2, and L1 segment.

Segments from L6 to L1 are upper level segments that store metadata (e.g., fingerprints) and may be referred to as LP segments. The lowest level segments are the L0 segments which represent actual data content of the file. An upper level segment references one or more lower level segments. Thus, an L6 segment includes an array of L5 references. An L5 segment includes an array of L4 references. An L4 segment includes an array of L3 references. An L3 segment includes an array of L2 references. An L2 segment includes an array of L1 references. An L1 segment includes an array of L0 references. In other words, lower level segments are referenced by higher level segments.

The example shown in FIG. 5 shows segment levels L6, L5, L1, and L0. Segment levels L4, L3, and L2 have been omitted for purposes of clarity. An L6 segment forms a root or parent. Thus, in the example shown in FIG. 5, there is a first segment tree 525 having an L6 segment 530 and representing a first file. There is a second segment tree 526 having an L6 segment 531 and representing a second file.

Two or more files may share a same segment. A lower level segment may be referenced by one or more upper level segments. For example, a lower level segment may be referenced by a first upper level segment, and a second upper level segment. The first upper level segment may be from a first segment tree representing a first file. The second upper level segment may be from a second segment tree representing a second file. An upper level segment may reference one or more lower level segments. For example, an upper level segment may reference a first lower level segment and a second lower level segment.

In the example shown in FIG. 5, L6 segment 530 references L5 segments 540, 541 as shown by arrows 532, 533 from L6 530 to L5 540, 541, respectively. L6 segment 531 references L5 segment 542 as shown by an arrow 534 from L6 531 to L5 542. L5 segment 540 references an L1 segment 550 as shown by an arrow 543 from L5 540 to L1 550. L5 segment 542 references L1 segments 551, 552 as shown by arrows 544, 545 from L5 542 to L1 551, 552, respectively. L5 segment 541 references L1 segment 551 as shown by an arrow 546 from L5 541 to L1 551. The arrows from the L5 to L1 segment level are shown in broken lines to indicate that there can be other intermediate levels between the L5 and L1 levels.

L1 segment 551 references L0 segments 560, 561 as shown by arrows 553, 554 from L1 551 to L0 560, 561, respectively. L1 segment 550 references L0 segments 562, 563 as shown by arrows 555, 556 from L1 550 to L0 562, 563, respectively. L1 segment 552 references L0 segments 561, 563 as shown by arrow 557, 558 from L1 552 to L0 561, 563, respectively.

In a specific embodiment, an upper level segment includes a fingerprint of fingerprints of one or more lower level segments referenced by the upper level segment. For example, L6 segment 530 includes a finger of fingerprints of L5 segments 540, 541. L6 segment 532 includes a fingerprint of fingerprint of L5 segment 542. L5 segment 540 includes a fingerprint of fingerprint of L1 segment 550. L5 segment 542 includes a fingerprint of fingerprints of L1 segments 551, 552, and so forth.

Figure 3B:
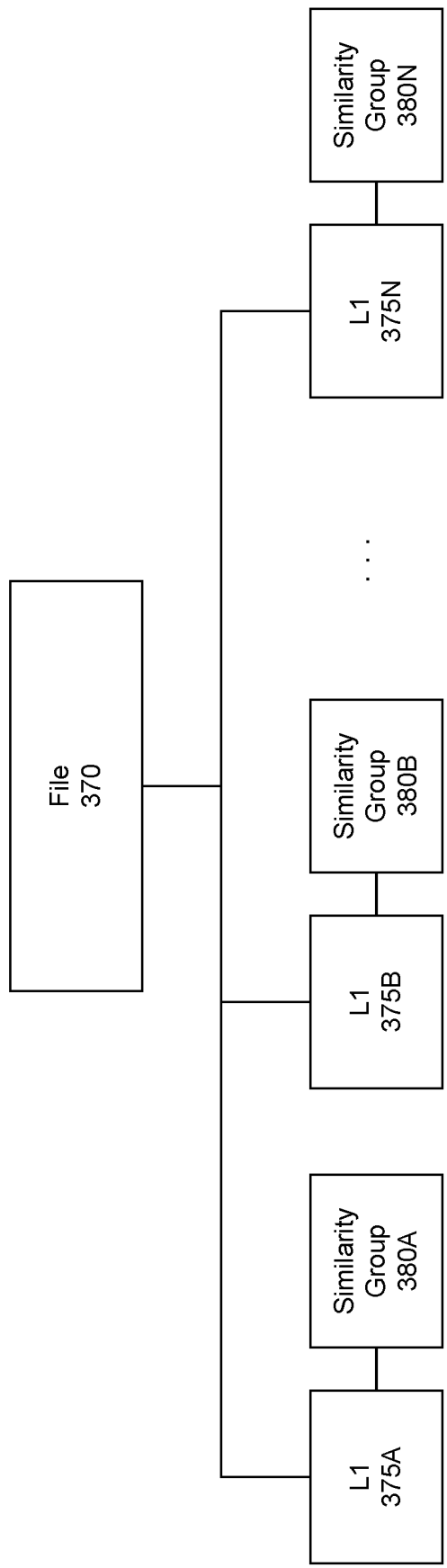
FIG. 3B shows a simplified block diagram of a structure of a file, according to one or more embodiments.

Referring back now to FIG. 3A, a similarity group, such as a similarity group 321A, includes a fingerprint index 336A that references one or more compression regions, such as a compression region 324A. A similarity group may reference a large number of compression regions in practice. In an embodiment, a compression region is only referenced by a single similarity group and its fingerprint index. A compression region, such as compression region 324A, includes segments 339A that form the actual data content of a file. A similarity group may be identified through a similarity group identifier (ID). As an example, FIG. 3B shows a simplified block diagram of a structure for a file 370. The file may be composed of one or more L1 segments (e.g., L1 segments 375A-N). Each L1 (variable size 1-12 MB) has its own similarity group ID (e.g., similarity groups 380A-N). A large file may have many L1 s and likely many different similarity group ID values (though repeats are possible). L1 segments may be referred to as segments at a last upper level of a segment tree.

A further discussion of similarity groups, associated data structures, and deduplication is provided in U.S. patent application Ser. No. 15/486,609, filed Apr. 13, 2017, now U.S. Pat. No. 10,795,860, issued Oct. 6, 2020, which is incorporated by reference along with all other references cited.

The mapping assignments include file (or file handle hashes) to front-end mappings 342 (FIG. 3A) and similarity group to back-end mappings 345. The file to front-end mappings specify ranges of files in the file system, via hashes of respective file handles, and the corresponding front-ends that have been assigned responsibility to those file handle hash ranges. That is, files in the ranges are identified using hashes of corresponding file handles. Table A below shows an example of a file mapping table.

TABLE A

| File handle hash range | Responsible front-end |
| --- | --- |
| File handle hash range A (e.g., files 1-100) | Front-end A |
| File handle hash range B (e.g., files 101-200) | Front-end B |
| . . . | . . . |

As shown in the example of table A above, a first front-end A has been assigned responsibility for handling a first subset of files in the file system (e.g., file handle hash range A or files 1-100), a second front-end B has been assigned responsibility for handling a second subset of files in the file system (e.g., file handle hash range B or files 101-200), and so forth.

The similarity group to back-ends mapping specify ranges of similarity groups and the corresponding back-ends that have been assigned responsibility. Table B below shows an example of a similarity group mapping table.

TABLE B

| Similarity group range | Responsible back-end |
| --- | --- |
| 0-63 | Back-end A |
| 64-127 | Back-end B |
| . . . | . . . |

As shown in the example of table B above, a first back-end A has been assigned responsibility for handling a first subset of similarity groups in the file system (e.g., similarity groups 0-63), a second back-end B has been assigned responsibility for handling a second subset of similarity groups in the file system (e.g., similarity groups 64-127), and so forth.

As discussed, the file system is implemented as a set of microservices including one or more of a load balancer 348, front-ends 351A-N, and back-ends 354A-N, managed by a container orchestration service 357, and hosted by a cluster of nodes 360. Each of the load balancer, front-end, and back-end operate in conjunction with each other to handle file system operations such as reading a file, writing a file, deleting a file, creating folders, and the like. The file system further includes an assignment manager 363. The assignment manager is responsible for generating, maintaining, and updating the mapping assignments including the file assignment mappings and similarity group assignment mappings.

The shared storage is accessible to each of the load balancer, front-end, and back-end. Thus, if any instance of a service happens to fail, a new instance of the service can be started and the new instance can access the shared storage to load the appropriate mapping assignments. For example, if a load balancer happens to fail, another new load balancer can be started. The new load balancer can access the shared storage to load the file assignment mapping information. Similarly, if a front-end were to fail, another new front-end can be started and assume the responsibilities of the failed front-end including their portion of the file ranges or namespace. Alternatively, the responsibility of the failed front-end can be re-distributed across one or more of the remaining front-ends. Similarly, if a back-end were to fail, another new back-end can be started and assume the responsibilities of the failed back-end including their portion of the similarity group ranges. Alternatively, the responsibility of the failed back-end can be re-distributed across one or more of the remaining back-ends.

Instances of the load balancer, front-end, and back-end maintain state information to facilitate consistent routing and assignment of file operation requests. In turn, this allows for processing file operations using information cached in memory by a particular instance rather than having to repeatedly access the shared storage.

For example, each instance of the load balancer maintains in memory 365 a copy 366 of the file assignment mappings to the front-ends. The load balancer, upon receiving a request to perform a file system operation on a particular file, can consult the file assignments to identify a particular front-end that has been assigned responsibility for handling that particular range of files within which the particular file is included. The load balancer can then route or assign the request to that particular front-end for processing.

The file assignment mappings allow the load balancer to assign and direct various file system requests to particular front-ends on a consistent basis. As an example, consider a request to write to a file. The load balancer reviews the file assignment mappings to identify a particular front-end that is responsible for the file (based on a hash of the file handle) and directs the request to the particular front-end. Subsequently, if there is an on-going operation or other immediate request involving the file, such as a read of the file, the load balancer again reviews the file assignment mappings and directs the subsequent request to the same particular front-end to process the subsequent request. This helps to improve performance because much of the information required to process the subsequent request is likely to have remained in memory at the particular front-end.

The front-ends are responsible for handling namespace operations and processes involving upper levels of the segment trees, e.g., L6-L2 segments. For example, file system operations including opening, closing, and renaming files and directories, creating new files and folders, moving files and files and folders, updating files and folders, writing or overwriting files and folders, and the like involve the manipulation of metadata including updates to the namespace so that segments are properly referenced throughout the segment trees. Thus, namespace operations handled by the front-ends may include generating and inserting segment references for new files or for new segments of an existing file; or removing segment references such as in cases of file deletions.

Locking, coordination, and collision issues among the different front-ends is reduced or avoided because each front-end operates on its assigned range of files or portion of the namespace independent of another front-end which is assigned a different range of files or portion of the namespace. In other words, the load balancer consistently routes requests for specific files to specific front-ends for processing. As a result, global locks are not necessary. A front-end does not have to communicate with other-front-ends to lock portions of the Btree because each specific front-end is uniquely responsible for a specific portion of the Btree. For example, file and folder updates require updating the Btree structure for the namespace. A particular front-end can acquire a lock on parts of the Btree, make the updates in memory, update the shared storage, and release the locks. The particular front-end does not have to coordinate with other front-ends about the lock because the other front-ends are assigned responsibility over different portions of the namespace.

The consistent routing of file system requests also allows for exploiting memory caches, thus improving performance. Data does not have to be immediately persisted to shared storage to ensure consistency. For example, consider that a client requests a write to a particular file and soon after requests a read of the file. The write may be cached and before the write is removed from memory, the read can be processed by accessing the latest data (e.g., write data) from the memory cache. In other words, the write may be committed to storage and also still reside in the memory cache.

Each instance of the front-end maintains in memory 368 a copy 369 of the similarity group assignment mappings to the back-ends. When a file system request includes segments to write, the mapping allows the front-end to route the request and segments to a particular back-end for handling. Specifically, the front-end forms an L1 segment (which may contain many 8 KB L0 segments) and calculates a similarity group ID based on the L1 segment. The front-end consults the similarity group assignment mapping to identify a particular back-end that is responsible for that range of similarity groups within which the calculated similarity group ID falls. In other words, the front-end uses the similarity group ID to lookup or find in the similarity group mapping the particular back-end responsible for that similarity group. The front-end then routes the L1 (including all the 8 KB L0 segments) to the particular back-end for processing. For example, a back-end may be responsible for similarity groups 0-63. Another back-end may be responsible for similarity groups 64-127, and so forth.

Back-ends are responsible for processes involving lower levels of the segment trees, e.g., L1-L0 segments, including deduplication, compression, and storage of segments at a lowest level of the segment trees, e.g., L0 segments. In an embodiment, each specific similarity group is associated with a specific fingerprint index and corresponding segments. In this embodiment, a back-end deduplicates L0 segments received from a front-end by checking the L0 segments against the specific fingerprint index associated with the specific similarity group, rather than deduplicating against a global fingerprint index. In other words, other fingerprint indexes associated with other similarity groups are not checked or examined. This helps to balance requirements for a good deduplication ratio and fast deduplication performance.

As an example, consider that a back-end is responsible for similarity groups 64-127, and each similarity group includes a fingerprint index of 1,000 fingerprints. A front-end has formed an L1 segment and calculated a particular similarity group ID based on the L1 segment, e.g., similarity group 72. The back-end deduplicates L0 segments associated with the L1 segment using a fingerprint index associated with similarity group 72. Fingerprint indexes associated with the other similarity groups, e.g., similarity groups 64-71 and 73-127, are not checked. In other words, each fingerprint index of each similarity group is handled independently. Segments that are not duplicates according to the specific fingerprint index of the specific similarity group, e.g., similarity group 72, are compressed into a compression region. The compression region, in turn, is packed into a container or other object with other compression regions and written to the shared storage.

The consistent routing of specific similarity groups to specific back-ends provides advantages similar to the consistent routing between the load balancer and front-ends. That is, each specific back-end is uniquely responsible for a specific range of similarity groups. Thus, global locks are not required. A back-end can cache state in memory and thus provide good performance. The back-end does not have to commit to shared storage in order to coordinate with other back-ends.

The design of the file system allows for efficient and granular scaling based on demand. In an embodiment, the scaling is handled by the container orchestration service. A number of instances of the load balancer, front-end, back-end, or combinations of these may scale dynamically. For example, during high demand for file system services (e.g., large numbers of clients issuing requests), a number of load balancer instances may be greater than a number of load balancer instances during low demand for file system services. When writing a large file, a number of back-end instances may be greater than a number of back-end instances than when writing a small file, and so forth. The number of instances of the load balancer, front-end, and back-end may scale independently of each other. That is, at any given time, a number of instances of the load balancer may be different from a number of instances of the front-end, a number of instances of the back-end, or both. A number of instances of the front-end may be different from a number of instances of the back-end.

The assignment manager is responsible for receiving indications of scaling events from the container orchestration service, balancing or rebalancing assignments including file assignments and similarity group assignments accordingly, and distributing the updated assignments or otherwise instructing the appropriate load balancer, front-end, or back-end instances to retrieve and load the updated assignments from shared storage. In other words, similarity group ranges and file (or file handle hash) ranges can be dynamically reassigned to maintain a balance across currently available front-ends, back-ends, or both.

Figure 6:
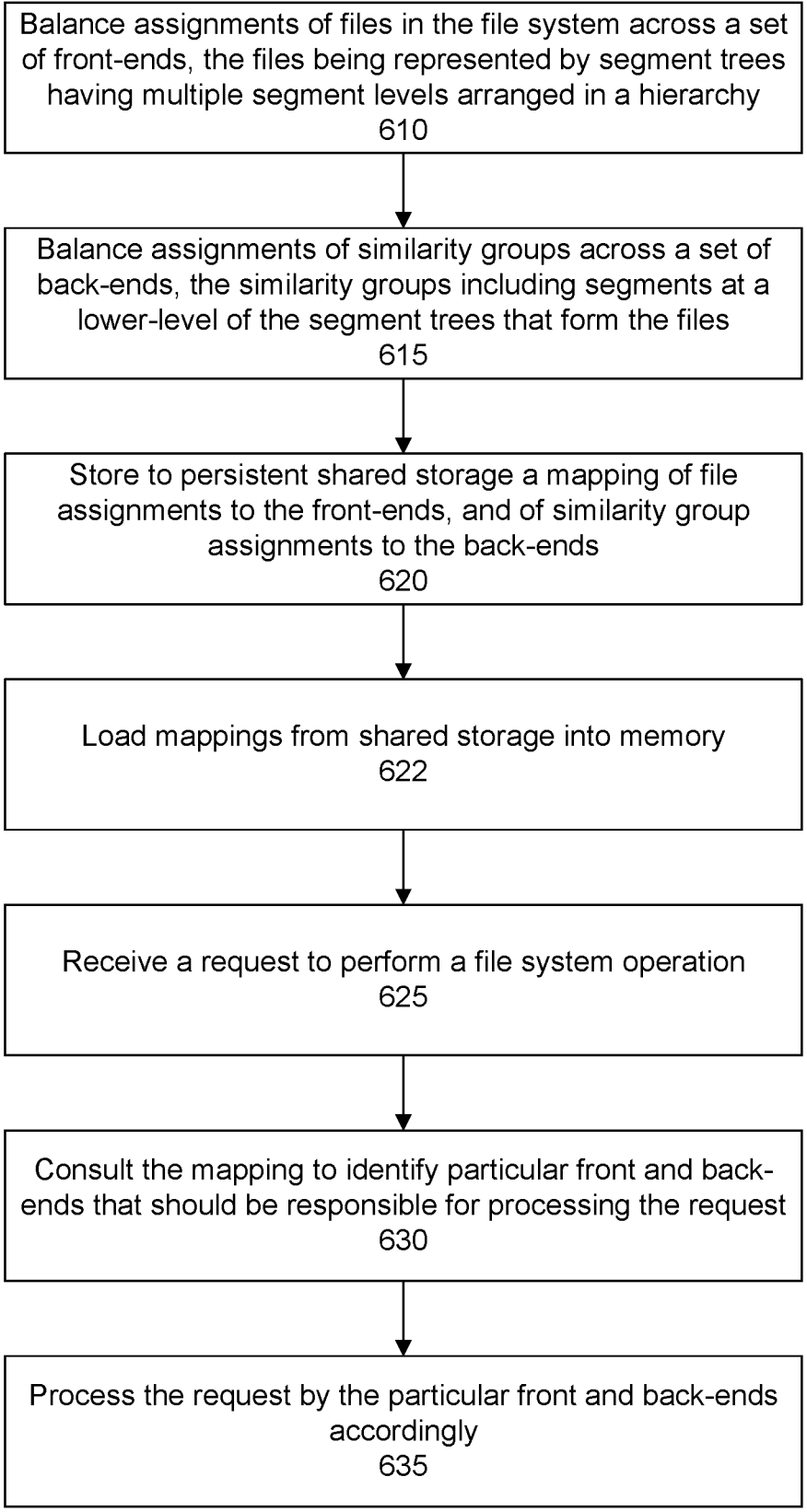
FIG. 6 shows an overall flow of a scale out deduplicated file system, according to one or more embodiments.

FIG. 6 shows an overall flow of the scale out deduplicated file system. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 610, assignments of files in the file system are balanced across a set of front-ends, the files being represented by segment trees having multiple segment levels arranged in a hierarchy. The files may be balanced equally or substantially equally across the front-ends based on the number of files and number of front-ends. Consider, an example, that the file system includes 100 files and 2 front-ends. In this example, a first front-end may be assigned responsibility for handling a first range of 50 files (e.g., files 1-50). A second front-end may be assigned for handling a second range of 50 files (e.g., files 51-100). In other embodiments, a different balancing scheme may instead be used that does not necessarily rely on the number of files or result in each front-end having an equal or substantially equal number of assigned files.

In a step 615, assignments of similarity groups are balanced across a set of back-ends, the similarity groups including segments at a lower level of the segment trees that form the files. The similarity groups may be balanced equally or substantially equally across the back-ends based on the number of similarity groups and number of back-ends. Consider, as an example, that the file system includes 127 similarity groups and 2 back-ends. In this example, a first back-end may be assigned responsibility for handling a first range of 64 similarity groups (e.g., similarity groups 0-63). A second back-end may be assigned responsibility for handling a second range of 64 similarity groups (e.g., similarity groups 64-127). In other embodiments, a different balancing scheme may instead be used that does not necessarily rely on the number of similarity groups or result in each back-end having an equal or substantially equal number of assigned similarity groups.

In a step 620, mappings of file assignments to the front-ends and of similarity group assignments to the back-ends are stored. The mappings may be stored persistently to the shared storage.

In a step 622, respective mappings are loaded from shared storage and into instances of the load balancer and front-ends. For example, a load balancer may store in memory a file mapping table as shown in the example of table A above. If there are multiple load balancers, each load balancer loads the file mapping assignments from the shared storage into memory so that file access requests from the clients can be directed to the responsible front-end regardless of which load balancer received the file access request.

A front-end may store in memory a similarity group mapping table as shown in the example of table B above. In other words, each front-end may load the similarity group mapping assignments from the shared storage into memory so that each front-end can direct file operations involving writes to the responsible back-end.

In a step 625, a request is received to perform a file system operation. The request may be issued by a client and received by the load-balancer. In a step 630, the mappings stored in memory are consulted or reviewed to identify particular front and back-ends that should be responsible for processing the request. In a step 635, the request is processed by the particular front and back-ends accordingly.

Consider, as an example, that the request includes file data to write to a file. The request may be accompanied by a file handle or other identifier corresponding to the file. The load balancer hashes the file handle to obtain a file handle hash value. The load balancer consults the file assignment mapping in memory to identify a particular front-end that is responsible for handling a range of files (or more particularly file handle hashes) within which the file handle hash value falls. The load balancer then assigns the request to the particular front-end.

The particular front-end, upon receipt of the request, splits, divides, or segments the file data into segments (e.g., last-level or L0 segments), forms an upper-level or next upper-level segment (e.g., L1 segment), from the L0 segments, computes an identifier of a similarity group based on the L1 segment, and consults the similarity group mapping, in memory, to identify a particular back-end that is responsible for handling a range of similarity groups within which the similarity group ID falls. The particular front-end then transmits the L1 segment, including all the L0 segments referenced by the L1 segment to the particular back-end for processing. Such processing includes deduplicating the L0 segments, and compressing and storing any new L0 segments.

A number of instances of the load balancer, front-end, and back-end may vary over time. For example, over time a number of front-ends may be scaled up or scaled down. The file mapping assignments provided to the load balancer are adjusted accordingly to ensure that the complete or full range of files in the file system is covered by the front-ends currently available.

Figure 7:
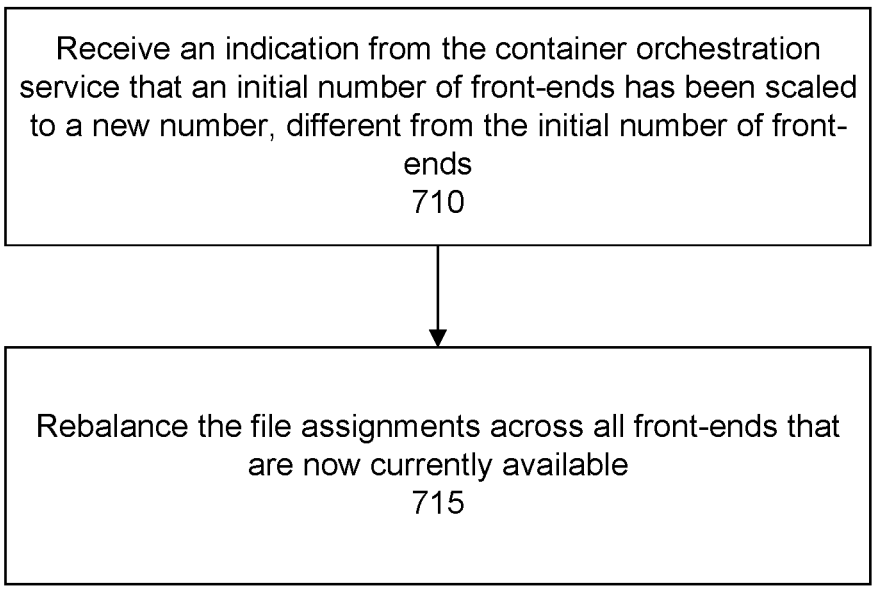
FIG. 7 shows a flow for rebalancing file assignments across front-ends, according to one or more embodiments.

Specifically, FIG. 7 shows a flow for rebalancing file assignments in response to a scaling event. In a step 710, an indication is received from the container orchestration service that an initial number of front-ends has been scaled to a new number, different from the initial number of front-ends. In a step 715, the file assignments are rebalanced across all front-ends that are now currently available.

Depending on the type of scaling event, a range of files that a front-end is responsible for may increase or decrease. For example, in a scale-up event a number of front-ends is increased. As a result, after the scale-up event, the previous front-ends will now be responsible for a smaller range of files because the new or additional front-ends will be assigned responsibility for at least some of the files previously assigned to the previous front-ends. That is, new file assignments will be distributed across the previous front-ends and the new or additional front-ends.

Consider, as an example, that there are two front-ends. A first front-end is assigned responsibility for a first range of files. A second front-end is assigned responsibility for a second range of files. After a scale-up event, a third front-end is added. The third front-end may be assigned responsibility for at least some of the files previously assigned to the first front-end, second front-end, or both. The third front-end may be assigned responsibility for a third range of files. The first range of files assigned to the first front-end may be replaced by a fourth range of files, where a number of files in the fourth range of files is less than a number of files in the first range of files. The second range of files assigned to the second front-end may be replaced by a fifth range of files, where a number of files in the fifth range of files is less than a number of files in the second range of files. At all times, the front-ends together cover the full range of files.

In an embodiment, a method includes receiving an indication that an initial number of front-ends has been scaled to a new number, greater than the initial number, the front-ends thereby now including previous front-ends and additional front-ends; replacing previous assignments of files across the previous front-ends with new assignments of files across the previous front-ends and the additional front-ends. The new assignments of files include new ranges of files for which the corresponding previous and additional front-ends are now responsible. The previous assignments of files to the previous front-ends include previous ranges of files for which the corresponding previous front-ends were responsible. A number of files in a new range of files is less than a number of files in a previous range of files, each previous front-end thereby now being responsible for a fewer number of files.

In a scale-down event a number of front-ends is reduced. As a result, the remaining front-ends will be responsible for a greater range or number of files. Consider, as an example, that there are three front-ends. A first front-end is assigned responsibility for a first range of files. A second front-end is assigned responsibility for a second range of files. A third front-end is assigned responsibility for a third range of files. After a scale-down event, the third front-end is removed. The first front-end, second front-end, or both may be assigned responsibility for files previously assigned to the third front-end. The first range of files assigned to the first front-end may be replaced by a fourth range of files, where a number of files in the fourth range of files is greater than a number of files in the first range of files. The second range of files assigned to the second front-end may be replaced by a fifth range of files, where a number of files in the fifth range of files is greater than a number of files in the second range of files.

In an embodiment, a method includes receiving an indication that an initial number of front-ends has been scaled to a new number, less than the initial number; and replacing previous assignments of files with new assignments of files across remaining front-ends. The new assignments of files include new ranges of files for which the remaining front-ends are now responsible. A number of files in the new ranges of files is greater than a number of files in previous ranges of files for which the remaining front-ends were previously assigned.

Figure 8:
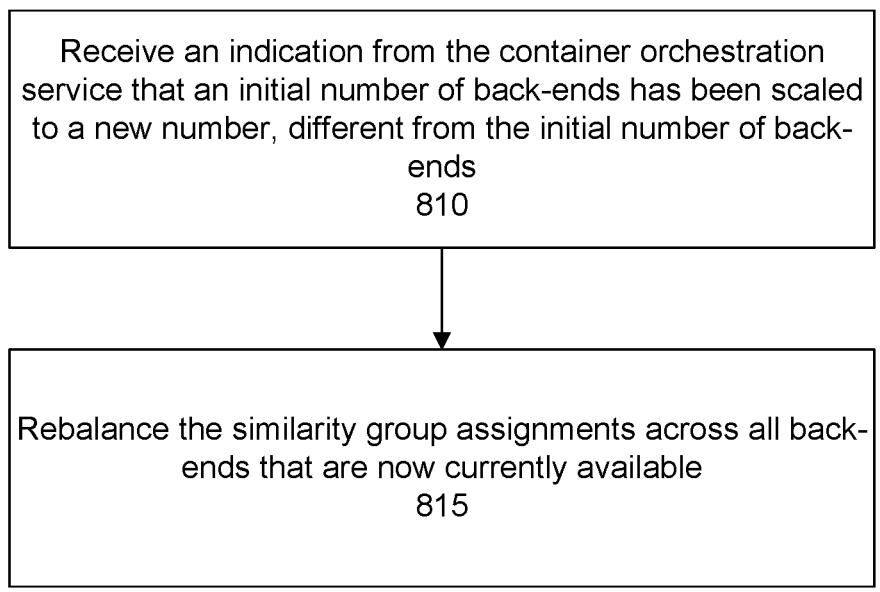
FIG. 8 shows a flow for rebalancing similarity group assignments across back-ends, according to one or more embodiments.

FIG. 8 shows a flow for rebalancing similarity group assignments in response to a scaling event. In a step 810, an indication is received from the container orchestration service that an initial number of back-ends has been scaled to a new number, different from the initial number of back-ends. In a step 815, similarity group assignments are rebalanced across all back-ends that are now currently available.

Depending on the type of scaling event, a range or number of similarity groups that a back-end is responsible for may increase or decrease. For example, in a scale-up event a number of back-ends is increased. As a result, after the scale-up event, the previous back-ends will now be responsible for a smaller range or number of similarity groups because the new or additional back-ends will be assigned responsibility for at least some of the similarity groups previously assigned to the previous back-ends. That is, new similarity group assignments will be distributed across the previous back-ends and the new or additional back-ends.

Consider, as an example, that there are two back-ends. A first back-end is assigned responsibility for a first range of similarity groups. A second back-end is assigned responsibility for a second range of similarity groups. After a scale-up event, a third back-end is added. The third back-end may be assigned responsibility for at least some of the similarity groups previously assigned to the first back-end, second back-end, or both. The third back-end may be assigned responsibility for a third range of similarity groups. The first range of similarity groups assigned to the first back-end may be replaced by a fourth range of similarity groups, where a number of similarity groups in the fourth range of similarity groups is less than a number of similarity groups in the first range of similarity groups. The second range of similarity groups assigned to the second back-end may be replaced by a fifth range of similarity groups, where a number of similarity groups in the fifth range of similarity groups is less than a number of similarity groups in the second range of similarity groups.

In an embodiment, a method includes receiving an indication that an initial number of back-ends has been scaled to a new number, greater than the initial number, the back-ends thereby now including previous back-ends and additional back-ends; replacing previous assignments of similarity groups across the previous back-ends with new assignments of similarity groups across the previous back-ends and the additional back-ends. The new assignments of similarity groups include new ranges of similarity groups for which the corresponding previous and additional back-ends are now responsible. The previous assignments of similarity groups to the previous back-ends include previous ranges of similarity groups for which the corresponding previous back-ends were responsible. A number of similarity groups in a new range of similarity groups is less than a number of similarity groups in a previous range of similarity groups, each previous back-end thereby now being responsible for a fewer number of similarity groups.

In a scale-down event a number of back-ends may be reduced. As a result, the remaining back-ends will be responsible for a greater range or number of similarity groups. Consider, as an example, that there are three back-ends. A first back-end is assigned responsibility for a first range of similarity groups. A second back-end is assigned responsibility for a second range of similarity groups. A third back-end is assigned responsibility for a third range of similarity groups. After a scale-down event, the third back-end is removed. The first back-end, second back-end, or both may be assigned responsibility for files previously assigned to the third back-end. The first range of similarity groups assigned to the first back-end may be replaced by a fourth range of similarity groups, where a number of similarity groups in the fourth range of similarity groups is greater than a number of similarity groups in the first range of similarity groups. The second range of similarity groups assigned to the second back-end may be replaced by a fifth range of similarity groups, where a number of similarity groups in the fifth range of similarity groups is greater than a number of similarity groups in the second range of similarity groups.

In an embodiment, a method includes receiving an indication that an initial number of back-ends has been scaled to a new number, less than the initial number; and replacing previous assignments of similarity groups with new assignments of similarity groups across remaining back-ends. The new assignments of similarity groups include new ranges of similarity groups for which the remaining back-ends are now responsible. A number of similarity groups in the new ranges of similarity groups is greater than a number of similarity groups in previous ranges of similarity groups for which the remaining back-ends were previously as signed.

The design of the system is very resilient to failures. For example, if the container orchestration service detects a problem with a particular front-end, the container orchestration service can start a new instance of the front-end. Alternatively, if a new instance of the front-end cannot be started, the assignment manager updates the file assignment mappings so that the complete range of files in the file system remains covered by currently available front-ends. The load balancer can then load the updated file assignment mappings from shared storage into memory. Likewise, if the container orchestration service detects a problem with a particular back-end, the container orchestration service can start a new instance of the back-end. Alternatively, if a new instance of the back-end cannot be started, the assignment manager updates the similarity group mappings so that the complete range of similarity groups in the file system remains covered by currently available back-ends.

In an embodiment, there is a method for a deduplicated file system as a plurality of microservices comprising front-ends and back-ends, the method comprising: balancing assignments of files in the file system across the front-ends, the files being represented by segment trees; balancing assignments of similarity groups across the back-ends, the similarity groups comprising segments at a lower-level of the segment trees that form the files, the front-ends being responsible for operations involving an upper-level of the segment trees, and the back-ends being responsible for operations involving the lower-level of the segment trees; storing a mapping of file assignments to the front-ends, and of similarity group assignments to the back-ends; receiving, by a load balancer, a request to perform a file system operation; consulting, by the load balancer, the file assignments to identify a particular front-end that should be assigned the request; consulting, by the particular front-end, the similarity group assignments to identify a particular back-end that should be responsible for processing segments associated with the request, the segments belonging to a similarity group that has been assigned to the particular back-end; and sending, by the particular front-end, the segments to the particular back-end.

In an embodiment, the request to perform the file system operation comprises an identification of a file and the method further comprises: receiving, by the load balancer, a subsequent request involving the same file; and assigning, by the load balancer, the subsequent request to the same particular front-end.

In an embodiment, the request to perform the file system operation comprises incoming data for a file, and the method further comprises: segmenting, by the particular front-end, the data into a plurality of segments corresponding to the lower-level of segments in the segment trees; representing each of one or more subsets of the lower-level of segments by one or more respective higher-level segments, each of the one or more higher-level segments being associated with one or more respective similarity groups; and sending each of the one or more higher-level segments, including the one or more subsets of the lower-level segments, to one or more back-ends according to the similarity group assignments.

In an embodiment, the method includes receiving an indication from a container orchestration service that an initial number of the plurality of microservices has been scaled to a new number, different from the initial number; and based on the new number of microservices, rebalancing one or more of the file assignments to the front-ends or the similarity group assignments to the back-ends.

In an embodiment, the method includes receiving an indication from a container orchestration service that an initial number of the front-ends has been scaled to a new number, different from the initial number; and replacing previous assignments of files with new assignments of files, wherein when the scaling comprises increasing a number of the front-ends, the new assignments of files comprise new ranges of files for which additional front-ends and previous front-ends are now responsible, a number of files in a new range of files now being less than a number of files in a previous range of files, each previous front-end thereby now being responsible for a fewer number of files, and wherein when the scaling comprises decreasing the number of front-ends, the new assignments of files comprise new ranges of files for which remaining front-ends are now responsible, a number of files in the new range of files now being greater than the number of files in the previous range of files, each remaining front-end thereby now being responsible for a greater number of files.

In an embodiment, the method includes: receiving an indication from a container orchestration service that an initial number of the back-ends has been scaled to a new number, different from the initial number; and replacing previous assignments of similarity groups with new assignments of similarity groups, wherein when the scaling comprises increasing a number of the back-ends, the new assignments of back-ends comprise new ranges of similarity groups for which additional back-ends and previous back-ends are now responsible, a number of similarity groups in a new range of similarity groups now being less than a number of similarity groups in a previous range of similarity groups, each previous back-end thereby now being responsible for a fewer number of similarity groups, and wherein when the scaling comprises decreasing the number of back-ends, the new assignments of similarity groups comprise new ranges of similarity groups for which remaining back-ends are now responsible, a number of similarity groups in the new range of similarity groups now being greater than the number of similarity groups in the previous range of similarity groups, each remaining back-end thereby now being responsible for a greater number of similarity groups.

In another embodiment, there is a system for a deduplicated file system as a plurality of microservices comprising front-ends and back-ends, and managed by a container orchestration service, the system comprising: a processor; and memory configured to store one or more sequences of instructions which, when executed by the processor, cause the processor to carry out the steps of: balancing assignments of files in the file system across the front-ends, the files being represented by segment trees; balancing assignments of similarity groups across the back-ends, the similarity groups comprising segments at a lower-level of the segment trees that form the files, the front-ends being responsible for operations involving an upper-level of the segment trees, and the back-ends being responsible for operations involving the lower-level of the segment trees;

storing a mapping of file assignments to the front-ends, and of similarity group assignments to the back-ends; receiving, by a load balancer, a request to perform a file system operation; consulting, by the load balancer, the file assignments to identify a particular front-end that should be assigned the request; consulting, by the particular front-end, the similarity group assignments to identify a particular back-end that should be responsible for processing segments associated with the request, the segments belonging to a similarity group that has been assigned to the particular back-end; and sending, by the particular front-end, the segments to the particular back-end.

In an embodiment, there is a computer program product, comprising a non-transitory computer-readable medium having a computer-readable program code embodied therein, the computer-readable program code adapted to be executed by one or more processors to implement a method for a deduplicated file system as a plurality of microservices comprising front-ends and back-ends, and managed by a container orchestration service, the method comprising: balancing assignments of files in the file system across the front-ends, the files being represented by segment trees; balancing assignments of similarity groups across the back-ends, the similarity groups comprising segments at a lower-level of the segment trees that form the files, the front-ends being responsible for operations involving an upper-level of the segment trees, and the back-ends being responsible for operations involving the lower-level of the segment trees; storing a mapping of file assignments to the front-ends, and of similarity group assignments to the back-ends; receiving, by a load balancer, a request to perform a file system operation; consulting, by the load balancer, the file assignments to identify a particular front-end that should be assigned the request; consulting, by the particular front-end, the similarity group assignments to identify a particular back-end that should be responsible for processing segments associated with the request, the segments belonging to a similarity group that has been assigned to the particular back-end; and sending, by the particular front-end, the segments to the particular back-end.

In an embodiment, there is a method of scaling a deduplicated file system as a plurality of microservices comprising front-ends and back-ends, and managed by a container orchestration service, the method comprising: balancing assignments of files in the file system across the front-ends, the files being represented by segment trees comprising multiple segment levels arranged in a hierarchy; balancing assignments of similarity groups across the back-ends, the similarity groups comprising segments at a lower-level of the segment trees that form the files, wherein the front-ends are responsible for operations involving an upper-level of the segment trees, and the back-ends are responsible for operations involving the lower-level of the segment trees; storing a mapping of file assignments to the front-ends, and of similarity group assignments to the back-ends; receiving a request to perform a file system operation; consulting the mapping to identify particular front and back-ends that should be responsible for processing the request; receiving an indication from the container orchestration service that an initial number of the plurality of microservices has been scaled to a new number, different from the initial number; and based on the new number of microservices, rebalancing one or more of the file assignments to the front-ends or the similarity group assignments to the back-ends.

In an embodiment, the plurality of microservices comprise one or more load balancers, and the method further comprises: receiving, by a load balancer, the request to perform the file system operation from a client, the request comprising an identification of a file, and issued by the client according to a file system protocol; determining, from the mapping, the particular front-end that has been assigned responsibility for the file; assigning the request to the particular front-end; receiving, by the load balancer, a subsequent request from the client involving the same file; and assigning the subsequent request to the same particular front-end.

In an embodiment, the request to perform the file system operation comprises incoming data for a file, and the method further comprises: segmenting, by the particular front-end, the data into a plurality of segments corresponding to the lower-level of segments in the segment trees; calculating a similarity group identifier based on the lower-level of segments; looking up, with the similarity group identifier, the similarity group assignments in the mapping to identify the particular back-end; and transmitting the lower-level of segments to the particular back-end for processing, wherein the similarity group assignments specify ranges of similarity group identifiers for which corresponding back-ends are responsible.

In an embodiment, after scaling of the plurality of microservices, the back-ends comprise additional back-ends, and the rebalancing comprises: replacing previous assignments of similarity groups across previous back-ends with new assignments of similarity groups across the previous back-ends and the additional back-ends, wherein the new assignments of similarity groups comprise new ranges of similarity groups for which corresponding previous and additional back-ends are now responsible, wherein the previous assignments of similarity groups to the previous back-ends comprise previous ranges of similarity groups for which the corresponding previous back-ends were responsible, and wherein a number of similarity groups in a new range of similarity groups is less than a number of similarity groups in a previous range of similarity groups, each previous back-end thereby now being responsible for a fewer number of similarity groups.

In an embodiment, after scaling of the plurality of microservices, the front-ends comprise additional front-ends, and the rebalancing comprises: replacing previous assignments of files across previous front-ends with new assignments of files across the previous front-ends and the additional front-ends, wherein the new assignments of files comprise new ranges of files for which corresponding previous and additional front-ends are now responsible, wherein the previous assignments of files to the previous front-ends comprise previous ranges of files for which the corresponding previous front-ends were responsible, and wherein a number of files in a new range of files is less than a number of files in a previous range of files, each previous front-end thereby now being responsible for a fewer number of files.

In an embodiment, after scaling of the plurality of microservices, at least one of a number of front-ends, or a number of back-ends has decreased, and the rebalancing comprises: if the number of front-ends has decreased, replacing, at a load balancer, previous assignments of files to previous front-ends with new assignments of files to remaining front-ends, each remaining front-end thereby now being responsible for a greater number of files than before the scaling; and if the number of back-ends has decreased, replacing, at each front-end, previous assignments of similarity groups to previous back-ends with new assignments of similarity groups to remaining back-ends, each remaining back-end thereby now being responsible for a greater number of similarity groups than before the scaling.

In another embodiment, there is a system for scaling a deduplicated file system as a plurality of microservices comprising front-ends and back-ends, and managed by a container orchestration service, the system comprising: a processor; and memory configured to store one or more sequences of instructions which, when executed by the processor, cause the processor to carry out the steps of: balancing assignments of files in the file system across the front-ends, the files being represented by segment trees comprising multiple segment levels arranged in a hierarchy; balancing assignments of similarity groups across the back-ends, the similarity groups comprising segments at a lower-level of the segment trees that form the files, wherein the front-ends are responsible for operations involving an upper-level of the segment trees, and the back-ends are responsible for operations involving the lower-level of the segment trees; storing a mapping of file assignments to the front-ends, and of similarity group assignments to the back-ends; receiving a request to perform a file system operation; consulting the mapping to identify particular front and back-ends that should be responsible for processing the request; receiving an indication from the container orchestration service that an initial number of the plurality of microservices has been scaled to a new number, different from the initial number; and based on the new number of microservices, rebalancing one or more of the file assignments to the front-ends or the similarity group assignments to the back-ends.

In another embodiment, there is a computer program product, comprising a non-transitory computer-readable medium having a computer-readable program code embodied therein, the computer-readable program code adapted to be executed by one or more processors to implement a method of scaling a deduplicated file system as a plurality of microservices comprising front-ends and back-ends, and managed by a container orchestration service, the method comprising: balancing assignments of files in the file system across the front-ends, the files being represented by segment trees comprising multiple segment levels arranged in a hierarchy; balancing assignments of similarity groups across the back-ends, the similarity groups comprising segments at a lower-level of the segment trees that form the files, wherein the front-ends are responsible for operations involving an upper-level of the segment trees, and the back-ends are responsible for operations involving the lower-level of the segment trees; storing a mapping of file assignments to the front-ends, and of similarity group assignments to the back-ends; receiving a request to perform a file system operation; consulting the mapping to identify particular front and back-ends that should be responsible for processing the request; receiving an indication from the container orchestration service that an initial number of the plurality of microservices has been scaled to a new number, different from the initial number; and based on the new number of microservices, rebalancing one or more of the file assignments to the front-ends or the similarity group assignments to the back-ends.

Figure 9:
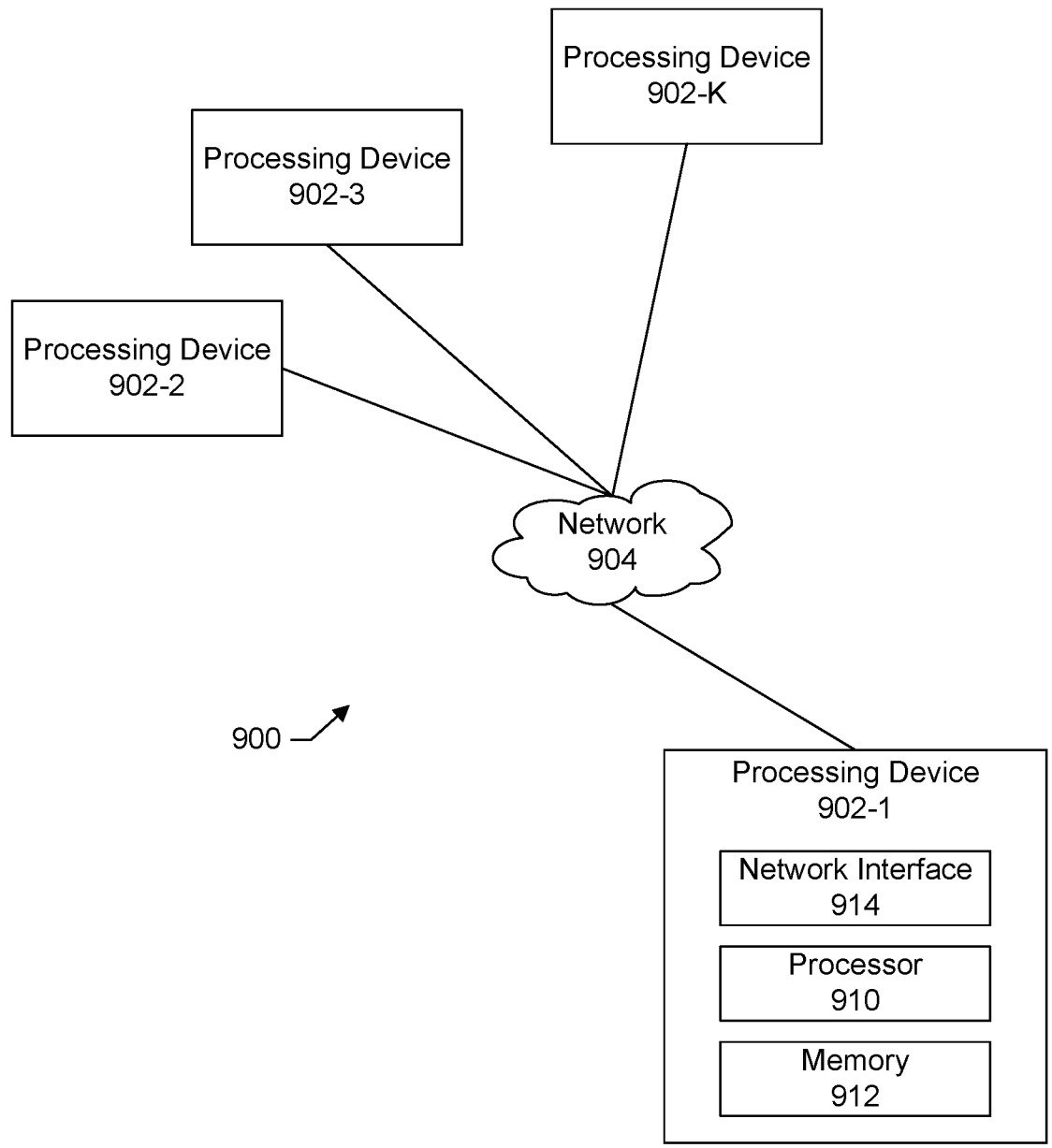
FIG. 9 shows a block diagram of a processing platform that may be utilized to implement at least a portion of an information processing system, according to one or more embodiments.

FIG. 9 shows an example of a processing platform 900 that may include at least a portion of the information handling system shown in FIG. 1. The example shown in FIG. 9 includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 10:
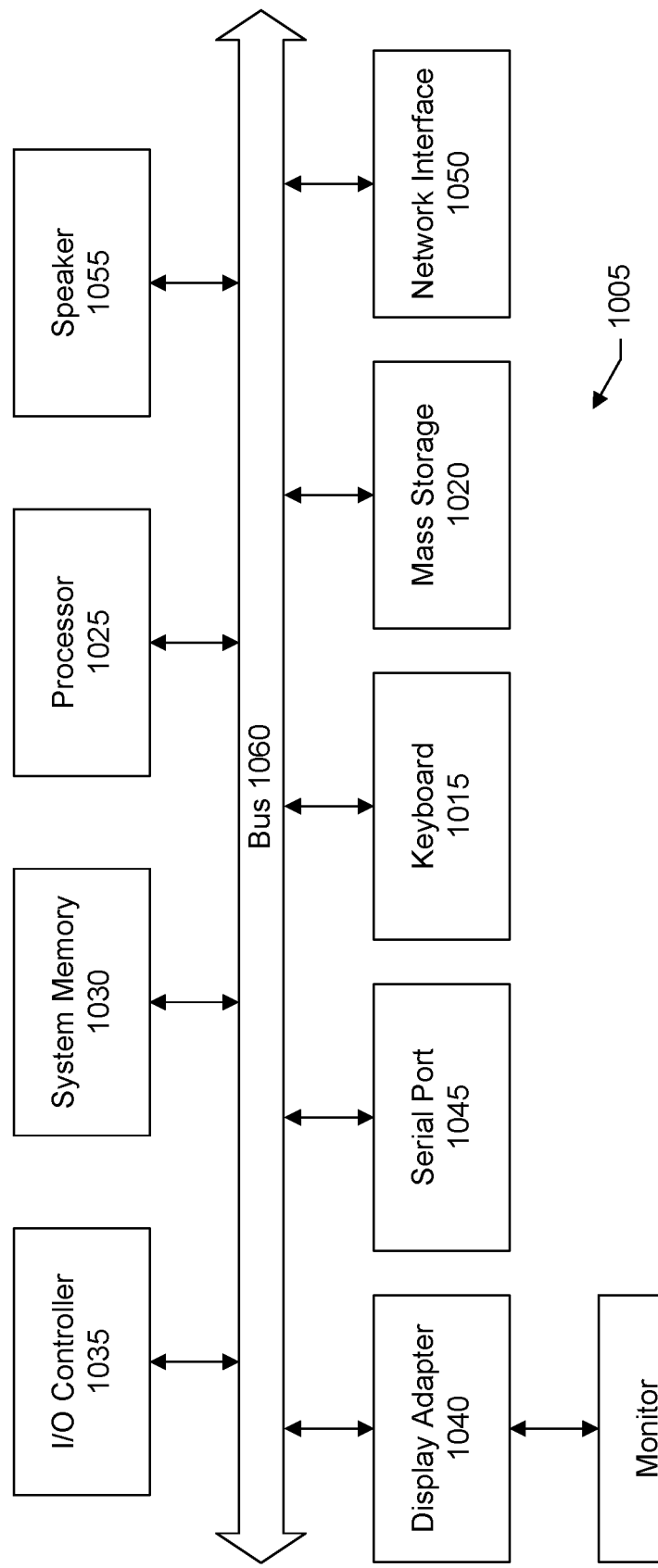
FIG. 10 shows a block diagram of a computer system suitable for use with the system, according to one or more embodiments.

FIG. 10 shows a system block diagram of a computer system 1005 used to execute the software of the present system described herein. The computer system includes a monitor 1007, keyboard 1015, and mass storage devices 1020. Computer system 1005 further includes subsystems such as central processor 1025, system memory 1030, input/output (I/O) controller 1035, display adapter 1040, serial or universal serial bus (USB) port 1045, network interface 1050, and speaker 1055. The system may also be used with computer systems with additional or fewer subsystems. For example, a computer system could include more than one processor 1025 (i.e., a multiprocessor system) or a system may include a cache memory.

Arrows such as 1060 represent the system bus architecture of computer system 1005. However, these arrows are illustrative of any interconnection scheme serving to link the subsystems. For example, speaker 1055 could be connected to the other subsystems through a port or have an internal direct connection to central processor 1025. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
    storing first mapping information, the first mapping information identifying ranges of files, a plurality of front-end microservices, and assignments of the ranges to the front-end microservices, each front-end microservice thereby being responsible for a range of files, the files being represented by segment trees, and the front-end microservices handling operations involving an upper-level of the segment trees;
    directing a file system request on a file to a particular front-end microservice that is responsible for handling a particular range of files within which the file falls according to the first mapping information;
    receiving an indication from a container orchestration service that a number of the plurality of front-end microservices has changed;
    updating the first mapping information based on the change in the number of the plurality of front-end microservices;
    storing second mapping information, the second mapping information identifying a plurality of similarity groups grouping segments into which the files have been split, a plurality of back-end microservices, and assignments of the similarity groups to the back-end microservices, each back-end microservice thereby being responsible for a subset of similarity groups, and the back-end microservices handling operations involving a lower-level of the segment trees;
    receiving an indication from the container orchestration service that a number of the plurality of back-end microservices has changed; and
    updating the second mapping information based on the change in the number of the plurality of back-end microservices.

2. The method of claim 1 wherein the receiving an indication from the container orchestration service that a number of the plurality of front-end microservices has changed is in response to the container orchestration service adding a new instance of a front-end microservice to handle an increase in demand.

3. The method of claim 1 wherein the receiving an indication from the container orchestration service that a number of the plurality of front-end microservices has changed is in response to the container orchestration service determining that an instance of a front-end microservice has failed and cannot be restarted.

4. The method of claim 1 wherein the file system request is a first file system request, the particular front-end microservice is a first particular front-end microservice, and the particular range of files is a first particular range of files, and the method further comprises:

after the updating the first mapping information, directing a second file system request on the file to a second particular front-end microservice, different from the first particular front-end microservice, according to the updated first mapping information.

5. The method of claim 1 further comprising:

when the number of the plurality of front-end microservices has decreased, increasing the range of files that each front-end microservice is now responsible for; and when the number of the plurality of front-end microservices has increased, decreasing the range of files that each front-end microservice is now responsible for.

6. A system comprising: a processor; and memory configured to store one or more sequences of instructions which, when executed by the processor, cause the processor to carry out the steps of:

storing first mapping information, the first mapping information identifying ranges of files, a plurality of front-end microservices, and assignments of the ranges to the front-end microservices, each front-end microservice thereby being responsible for a range of files, the files being represented by segment trees, and the front-end microservices handling operations involving an upper-level of the segment trees;

directing a file system request on a file to a particular front-end microservice that is responsible for handling a particular range of files within which the file falls according to the first mapping information; receiving an indication from a container orchestration service that a number of the plurality of front-end microservices has changed;

updating the first mapping information based on the change in the number of the plurality of front-end microservices;

storing second mapping information, the second mapping information identifying a plurality of similarity groups grouping segments into which the files have been split, a plurality of back-end microservices, and assignments of the similarity groups to the back-end microservices, each back-end microservice thereby being responsible for a subset of similarity groups, and the back-end microservices handling operations involving a lower-level of the segment trees;

receiving an indication from the container orchestration service that a number of the plurality of back-end microservices has changed; and updating the second mapping information based on the change in the number of the plurality of back-end microservices.

7. The system of claim 6 wherein the receiving an indication from the container orchestration service that a number of the plurality of front-end microservices has changed is in response to the container orchestration service adding a new instance of a front-end microservice to handle an increase in demand.

8. The system of claim 6 wherein the receiving an indication from the container orchestration service that a number of the plurality of front-end microservices has changed is in response to the container orchestration service determining that an instance of a front-end microservice has failed and cannot be restarted.

9. The system of claim 6 wherein the file system request is a first file system request, the particular front-end microservice is a first particular front-end microservice, and the particular range of files is a first particular range of files, and the processor further carries out the step of:

after the updating the first mapping information, directing a second file system request on the file to a second particular front-end microservice, different from the first particular front-end microservice, according to the updated first mapping information.

10. The system of claim 6 wherein the processor further carries out the steps of:

when the number of the plurality of front-end microservices has decreased, increasing the range of files that each front-end microservice is now responsible for; and when the number of the plurality of front-end microservices has increased, decreasing the range of files that each front-end microservice is now responsible for.

11. A computer program product, comprising a non-transitory computer-readable medium having a computer-readable program code embodied therein, the computer-readable program code adapted to be executed by one or more processors to implement a method comprising:

storing first mapping information, the first mapping information identifying ranges of files, a plurality of front-end microservices, and assignments of the ranges to the front-end microservices, each front-end microservice thereby being responsible for a range of files, the files being represented by segment trees, and the front-end microservices handling operations involving an upper-level of the segment trees;

directing a file system request on a file to a particular front-end microservice that is responsible for handling a particular range of files within which the file falls according to the first mapping information; receiving an indication from a container orchestration service that a number of the plurality of front-end microservices has changed;

updating the first mapping information based on the change in the number of the plurality of front-end microservices;

storing second mapping information, the second mapping information identifying a plurality of similarity groups grouping segments into which the files have been split, a plurality of back-end microservices, and assignments of the similarity groups to the back-end microservices, each back-end microservice thereby being responsible for a subset of similarity groups, and the back-end microservices handling operations involving a lower-level of the segment trees;

receiving an indication from the container orchestration service that a number of the plurality of back-end microservices has changed; and updating the second mapping information based on the change in the number of the plurality of back-end microservices.

12. The computer program product of claim 11 wherein the receiving an indication from the container orchestration service that a number of the plurality of front-end microservices has changed is in response to the container orchestration service adding a new instance of a front-end microservice to handle an increase in demand.

13. The computer program product of claim 11 wherein the receiving an indication from the container orchestration service that a number of the plurality of front-end microservices has changed is in response to the container orchestration service determining that an instance of a front-end microservice has failed and cannot be restarted.

14. The computer program product of claim 11 wherein the file system request is a first file system request, the particular front-end microservice is a first particular front-end microservice, and the particular range of files is a first particular range of files, and the method further comprises:
    after the updating the first mapping information, directing a second file system request on the file to a second particular front-end microservice, different from the first particular front-end microservice, according to the updated first mapping information.

15. The computer program product of claim 11 wherein the method further comprises:
    when the number of the plurality of front-end microservices has decreased, increasing the range of files that each front-end microservice is now responsible for; and
    when the number of the plurality of front-end microservices has increased, decreasing the range of files that each front-end microservice is now responsible for.

* * * * *